(12) United States Patent
Wynn et al.

(10) Patent No.: US 6,493,000 B1
(45) Date of Patent: Dec. 10, 2002

(54) METHOD AND SYSTEM FOR CONTROL OF SPAWNED WEB FRAMES

(75) Inventors: Allen C. Wynn, Round Rock; Cristi N. Ullmann, Austin; Michael W. Brown, Georgetown, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,226

(22) Filed: Feb. 17, 2000

(51) Int. Cl.$^7$ .................................................. G06F 3/00
(52) U.S. Cl. ....................................... 345/733; 707/513
(58) Field of Search ................................ 345/733, 753, 345/781, 848, 810, 853, 808; 707/500, 501, 513, 517, 526

(56) References Cited

U.S. PATENT DOCUMENTS

| | | |
|---|---|---|
| 5,625,781 A | 4/1997 | Cline et al. |
| 5,712,979 A | 1/1998 | Graber et al. |
| 5,854,630 A | 12/1998 | Nielsen |
| 6,266,058 B1 * | 7/2001 | Meyer ......................... 345/733 |
| 6,311,196 B1 * | 10/2001 | Arora et al. ................. 707/513 |

* cited by examiner

*Primary Examiner*—Cao H. Nguyen
(74) *Attorney, Agent, or Firm*—Robert H. Frantz; David A. Mims, Jr.

(57) ABSTRACT

A web browser with a set of controls which allows a user to select several page hold modes of operation when selecting standard or plain hyperlinks. In a first state, the web browser software will display pages in a way unaltered from it's standard functionality. In a second state, selection of any hyperlink on the parent page shown in the original instance of the web browser will result in the spawning of a new instance of the web browser in a new window showing the selected document, and the parent page will be "held" in the original instance of the web browser. The user may select many hyperlinks on the parent page, and many new instances of the web browser would be spawned. In the third state, only one additional web browser instance will created to display most recently selected document, and the parent page will be "held" in the original instance of the web browser. Finally, the web browser detects certain changes in the address of the document being viewed to the document selected by the user, and automatically updates the parent instance of the web browser to display a new parent page in the original instance of the web browser. The change criteria may be specified by the user, such as changes in host name and domain only, or change in host, domain or subdomain.

30 Claims, 8 Drawing Sheets

Figure 6 — Prior Art

METHOD AND SYSTEM FOR CONTROL OF SPAWNED WEB FRAMES

FEDERALLY SPONSORED RESEARCH AND DEVELOPMENT STATEMENT

This invention was not developed in conjunction with any Federally sponsored contract.

CROSS-REFERENCE TO RELATED APPLICATIONS (CLAIMING BENEFIT UNDER 35 U.S.C. 120)

None.

MICROFICHE APPENDIX

Not applicable.

BACKGROUND OF THE INVENTION

1. Field of the Invention

This invention pertains to the arts of web browser graphical user interface technology and web browser link history management. In particular, this invention relates to methods and systems for web browsers which allow the user to control the visual display of certain types of link and document retrieval operations.

2. Description of the Related Art

The Internet and the World Wide Web have become critical, integral parts of commercial operations, personal lives, and the education process. At the heart of the Internet content is Internet browser technology and Internet server technology. An Internet server contains content which is available to systems and browsers which have Internet connectivity. Web browser or "client" computers may request documents from web addresses, to which appropriate web servers respond by transmitting one or more web documents, image or graphics files, forms, audio clips, etc. The most common protocol for transmission of web documents and contents from servers to browsers is Hyper Text Transmission Protocol ("HTTP").

FIG. 1 shows the fundamental client-server arrangement of Internet and intranet communications. A client browser computer (1) is provided with Internet access (2) to the World Wide Web (3) through common means such as a dial-up telephone line and modem, cable modem, or local area network ("LAN"). The web browser computer (1) is also provided with appropriate web browsing software, such as Netscape's Navigator or Microsoft's Explorer. A web server computer (5) is likewise provided with Internet access (4) to the World Wide Web (3) using similar means, or higher-bandwidth means such as T1 and T3 data lines, and a web server suite of software. Alternatively, client and servers may be interconnected via an Intranet (6), such as a corporate LAN. These arrangements are well known within the art.

The most common type of Internet content or document is Hyper Text Markup Language ("HTML") documents, but other formats are equally well known in the art such as Adobe Portable Document Format ("PDF"). HTML, PDF and other web documents provide "hyperlinks" within the document, which allow a user to select another document or web site to view. Hyperlinks are specially marked text or areas in the document which when selected by the user commands the browser software to retrieve or fetch the indicated document. For example, the text <A HREF="http://www.patents.ibm.com">VIEW PATENTS</A> when embedded into an HTML document will produce a specially marked or highlighted string of text in the web browser window which simply reads "VIEW PATENTS". Most commonly, this text will appear in underlined blue text, but the HTML document may specify alternate display characteristics for hyperlinks, as well as the web browser may have options for the display of hyperlinks. If the web browser user selects the hyperlink, such as clicking on the hyperlink using a mouse, the web browser will request the base document from web address www.patents.ibm.com using HTTP commands. The appropriate server for this web address will respond to the request by transmitting a web document, such as index.htm, to the requesting web browser.

Ordinarily, when the user selects a plain hyperlink, the current page being displayed in the web broswer's graphical user interface ("GUI") window disappears and the newly received page is displayed. If the parent page is an index, for example the IBM web site www.patents.ibm.com, and the user wishes to visit each descending link (e.g. read the document with tips on how to use the site), then the parent or index page disappears and the new page is displayed (such as the help page). The user must click the browser's "back" button to return to displaying the parent page if desired.

FIG. 2 shows an example partial "site map" for a typical web site. A base document (21), or "home page", is transmitted by the hosting web server to a requesting web browser using HTTP whenever a web browser "points" to a plain web address without a file specification, such as www.corp.com. In FIG. 2, an example of a base HTML document "index.htm" includes four hyperlinks. If the user selects or clicks on the displayed link for "help", the file "help.htm" is transmitted by the web server to the browser. In the web browser GUI window, the display of "index.htm" (21) is replaced with a display of "help.htm" (22). The user can further select a hyperlink in "help.htm" (22), such as "Product A", which will cause the web browser to transmit the file "helpA.htm" (23). This can continue many layers deep, and does not have to be organized as a simple tree structure, as shown, because hyperlinks can refer to files on other web addresses, to other parent files, etc.

However, web browser software maintains a "history" of visited files assuming a tree-like structure. The "back" button shows the previous page, and the "forward" button shows the next page (if the "back" button has been used). Sometimes, a user may descend multiple layers into a web site in such a way that the "back" button must be pressed many times to return to this "main" or top level page.

Coding of the HTML pages can ease this burden to some degree by using "frames". In frames-based HTML pages, the user's web browser GUT window is split into multiple "panes", and the code in the HTML of the page can control presentation of the information in each frame. Typically, a top-level list of hyperlinks or navigation bar is presented in one pane, while selected documents are updated in another pane. FIG. 3 shows an example of a frames-based display. On a portion (30) of a the user's browser computer screen, a web browser (31), such as Netscape's Navigator, is running in its own window. The browser is currently pointed (34) at the top or home page of the example web site. The web page "index.htm" is configured to split the GUI display into three frames. The upper frame (32) is being used to display a general banner, the left frame (33) is being used to display a list of hyperlinks from the top page (or navigation bar), and the right-bottom frame (35) is displaying the contents of the currently selected page. If the user were to select the "help" hyperlink in the left frame (33), the display might proceed to appear as shown in FIG. 4. As shown in FIG. 4, the web browser (31) is now pointed (34) at the file "help.htm", and the contents of that file are displayed in the bottom-right frame or pane (35). Two hyperlinks (40 and 41) are shown in the bottom-right frame, with the top-level hyperlinks of index.htm still available in the left frame (33). This illustrates how the HTML page can control which information is replaced and which remains visible when a hyperlink is selected. However, frames are not a generalized solution, and must be included in the HTML source. This requires the web page and site designer to anticipate or predict the most likely path a user will traverse the pages in the site, and of course cannot cover all possibilities available.

Still other HTML coding functions allow some web pages which have hyperlinks to launch or "spawn" a new web browser instance in a new window. Using this functionality, if a user selects a certain hyperlink in the currently displayed page, an entirely new instance of the web browser is initiated in its own independent GUI window. Again, the web page designer must predict or anticipate which links a user would desire to spawn new window and which links the user may want to simply replace the current display. FIG. 5 illustrates an example of such a multiple-window scheme. In such a case, when a user selects one of the hyperlinks in the base page in the first browser window (31), a new instance of the browser is spawned in a new window (31') and the information for the selected page is displayed in the new window (31'). The new instance of the web browser is then completely independent of the first instance of the browser, and can be pointed to any web site or file as desired. Again, though, the web document designer must decide at the time of designing the web document which hyperlinks will spawn new browser windows and which will not. Additionally, this type of window spawning can be irritating to some web browser users, as the "back" and "forward" buttons in the new instances of the browsers do not inherit the history of the parent instance and do not work as expected by the user. So, if several instances of the browser are running concurrently as a result of several link selections, it may become confusing to the user which browser is the original browser with all of the history.

The conventional addressing scheme of the Internet includes several "labels" separated by "dots" to create a domain name, as follows:

subdomn   .   .   .   subdom2.
      subdom1.host.domsub\dir1\subdir2\. . . subdirn
    where: subdom=subdomain,
      host=host name,
      dom=top level domain
      subdir=subdirectory The Internet addressing scheme is tree-like, with subdomains and host names descending from the top level domains. Top level domains are the main divisions of the Internet addressing scheme, such as "com", "gov" and "edu". Top level domains also include the extension for foreign countries, such as "co.uk" for the United Kingdom, or "co.jp" for Japan. Host names are the highest level "label" which can be registered to a particular web server operator, such as "ibm". Subdomains are addressing divisions within host names which are administered by the host name owner, such as "patents.ibm.com". Subdirectories are file structures within a particular server which serves a host name address, such as "ibm.com\tech_suport". These addressing schemes are well-known within the art.

Therefore, there is a need in the art for an alternative method for selecting and viewing web documents from hyperlinks in other web documents. This method and system must allow the web browser user to select the type of advancement to the selected document, such as frames, spawning new windows, or traditional single window operation. Further, there is a need in the art for this method and system to allow some criteria to be specified to select between optional handling and advancement schemes based on changes in the addresses selected which may indicated movement from web site to web site. Additionally, this new method and system should be compatible with existing web document standards, such as HTML, browser packages and web server interfaces.

BRIEF DESCRIPTION OF THE DRAWINGS

The following detailed description when taken in conjunction with the figures presented herein present a complete description of the present invention.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

A standard web browser software package is modified to include a new set of controls. The standard web browser functionality already has the capability to receive and interpret HTML and other standard web documents, and in response to the web document contents, create and control frames in the web browser GUI display window or spawn new instances of the web browser in new windows seeding or initializing the new instance with a particular document.

The new set of controls allows the user to select several modes of operation when selecting standard or plain hyperlinks. The set of controls has three operational states. The first state allows the browser to behave and function unaltered from its standard functionality. The second state allows the user to select a mode of operation in which selection of any hyperlink on the parent page shown in the original instance of the web browser would result in the spawning of a new instance of the web browser in a new window showing the selected document. The user may select many hyperlinks on the parent page, and many new instances of the web browser would be spawned. In the third state, the user may select an operational mode in which only one additional web browser instance is created showing the most recent document selected in the parent page shown in the original web browser instance. This third state allows the user to have the parent page in one window, and the selected descending page in another window, but no other windows will be spawned. Finally, in an enhancement of the second and third states, the user may select a mode of operation in which the browser detects changes from the base address of the web site being viewed, and automatically updates the original instance of the web browser to point to a new parent page. Because the logic of when to spawn new web browser instances and what to show in the current and new instances is embedded into the enhanced web browser, it can be used to view and navigate any web site, not just web sites in which the documents contain special control codes to cause window spawning. Additionally, the user can enable and disable the enhancement at will, reducing the amount of frustration and confusion which is commonly experienced when browsing web documents which include embedded commands to spawn new web browser instances.

DETAILED DESCRIPTION OF THE INVENTION

Figure 1:
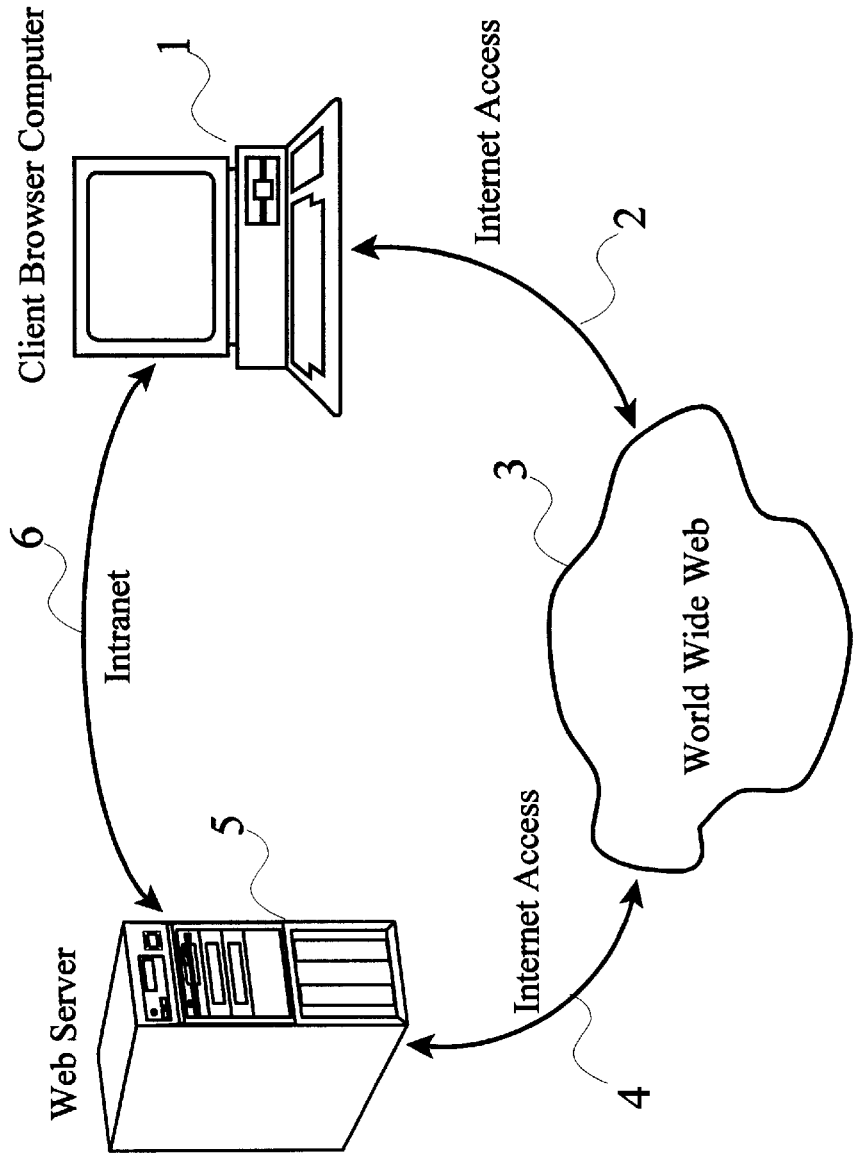
FIG. 1 shows the prior art arrangement of web browser systems, web server systems, the Internet and intranets.
Figure 2:
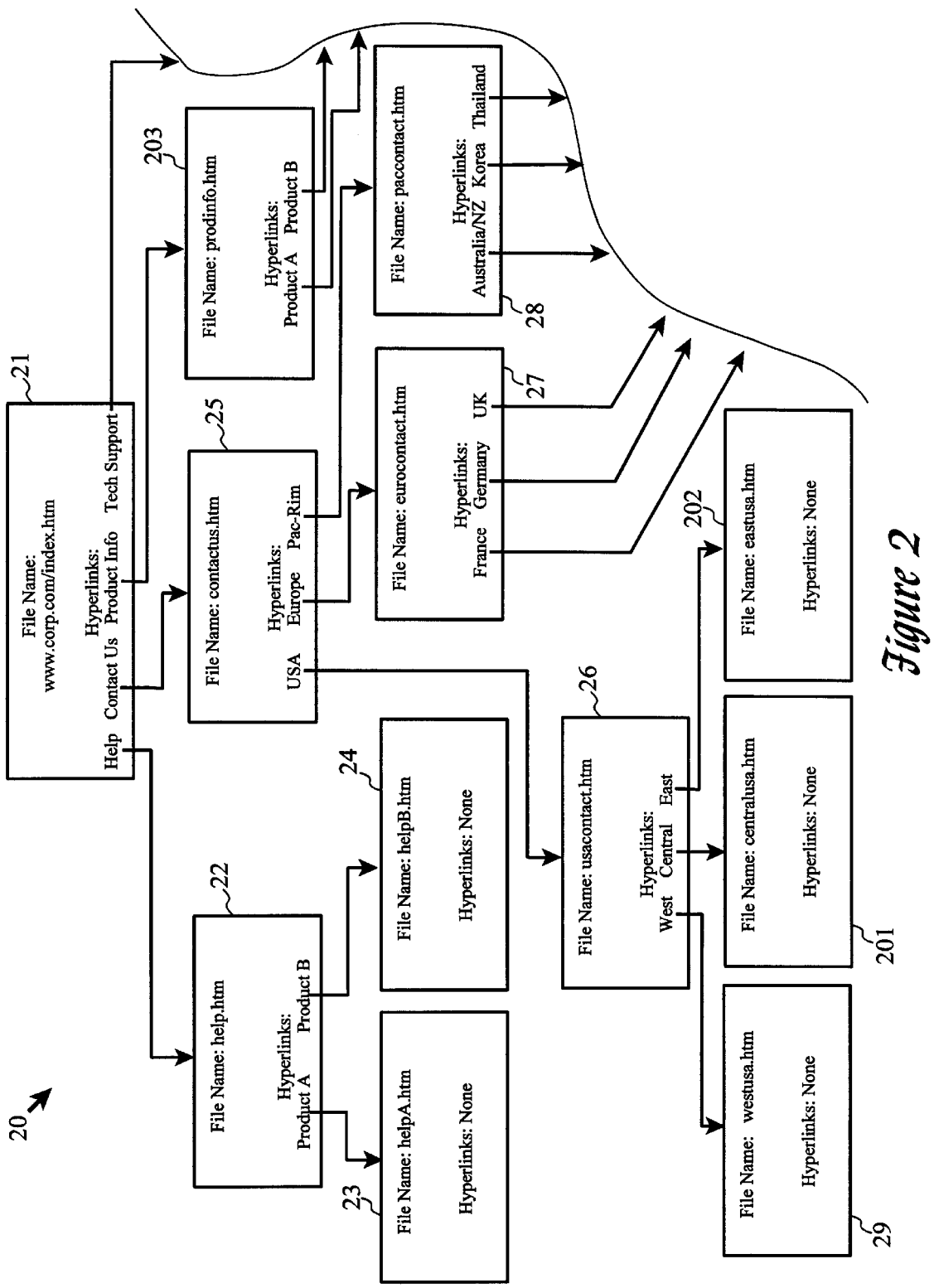
FIG. 2 presents an example web site map, with hyperlink relationships indicated.
Figure 3:
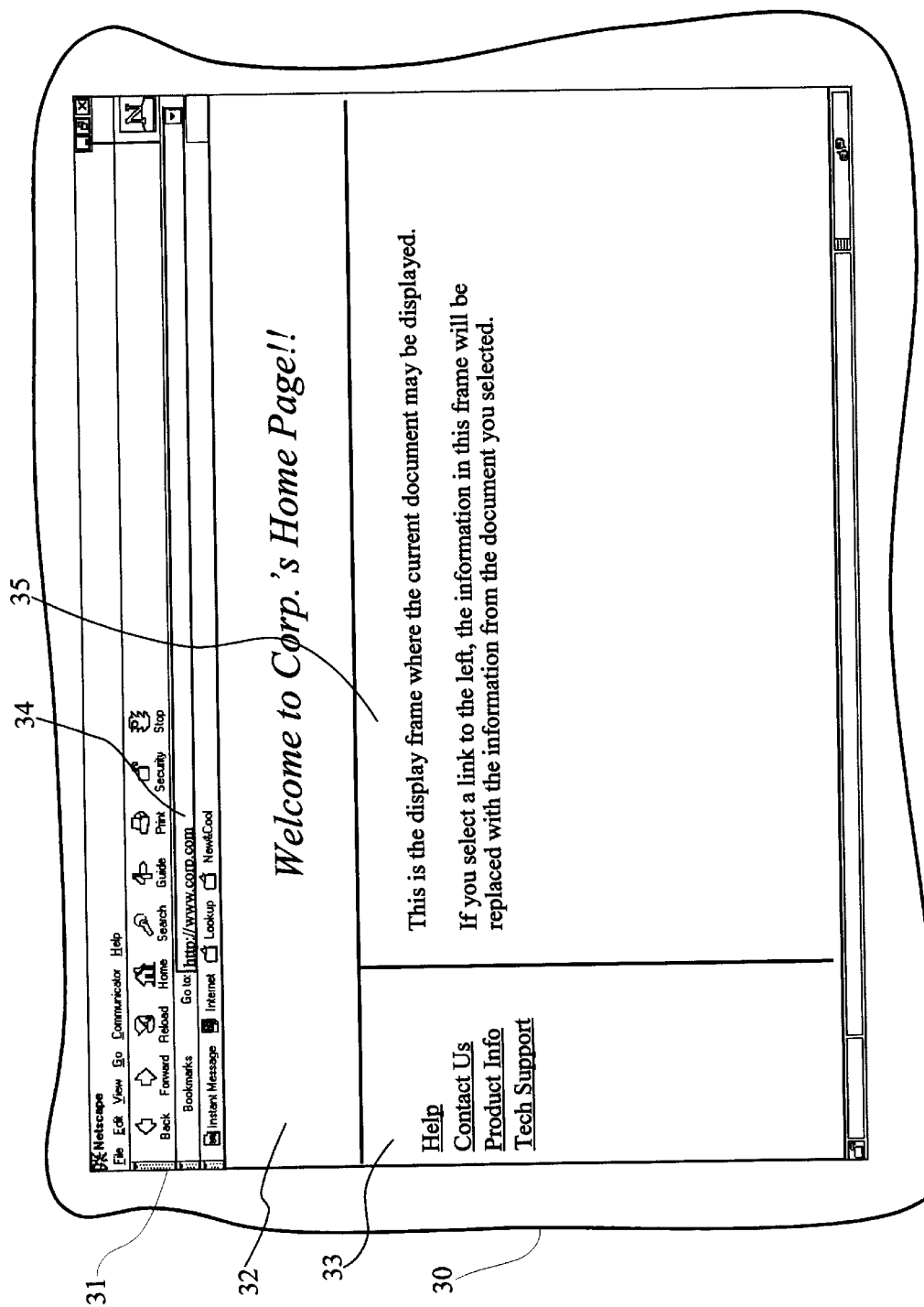
FIG. 3 illustrates an example of frames-based HTML display in a typical web browser graphical interface window.
Figure 4:
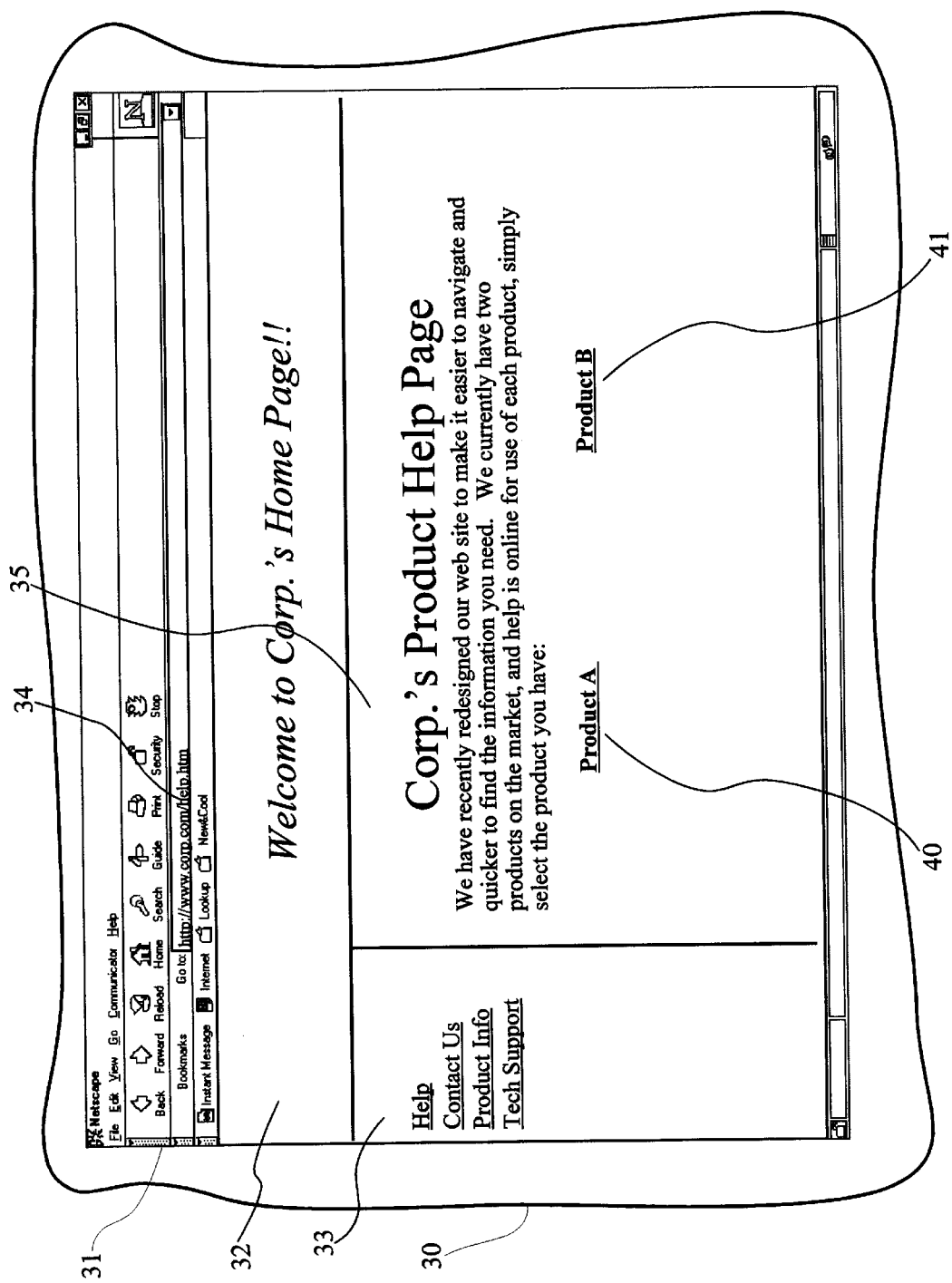
FIG. 4 shows an advancement of the display of FIG. 3 following selection of a hyperlink.
Figure 5:
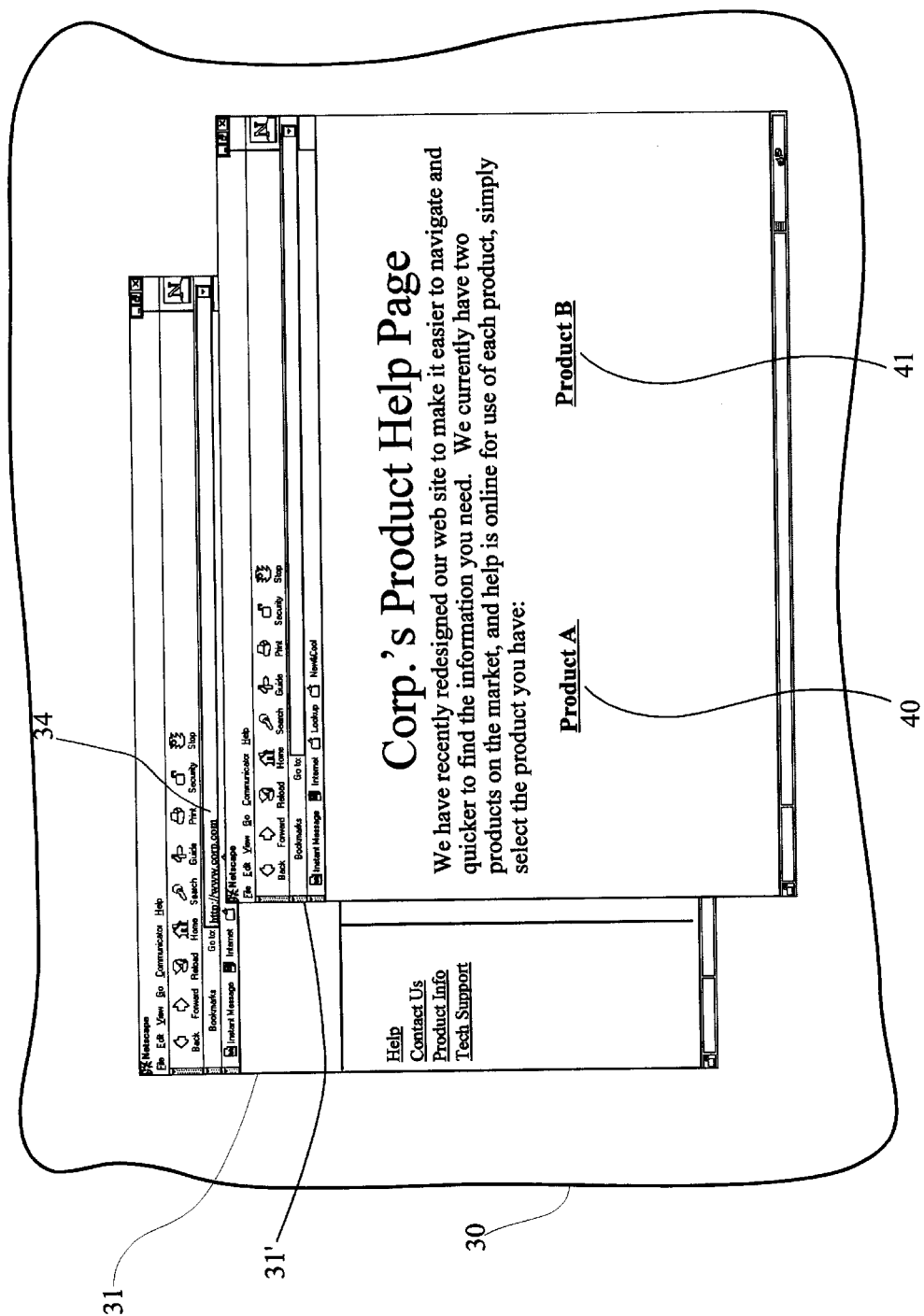
FIG. 5 provides a view of an example of spawning new web browser instances in a new window as a result of selecting a hyperlink.
Figure 6:
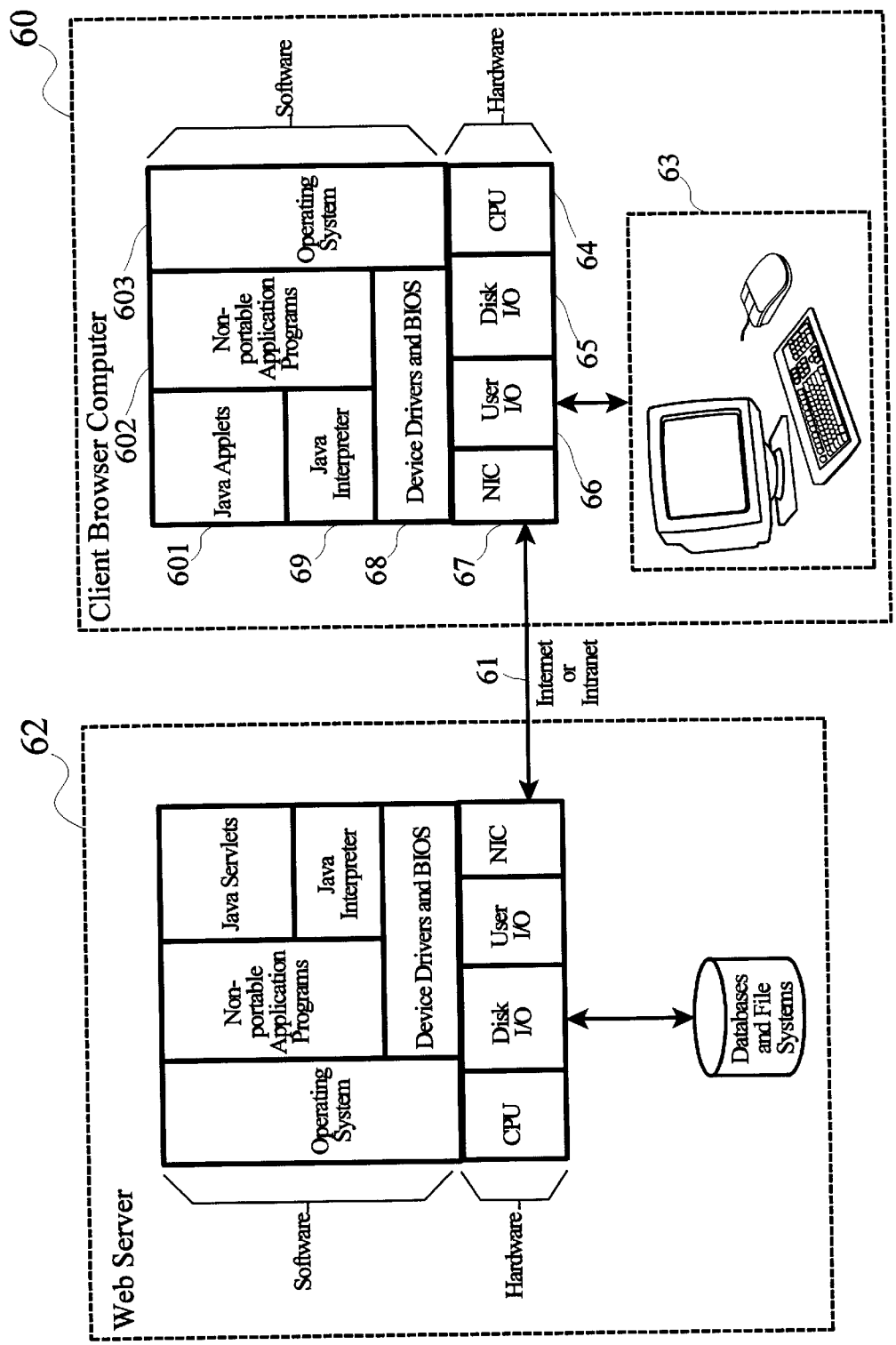
FIG. 6 depicts the general architecture of client web browser computers and web server computers.

The invention is preferably realized as software and functionality modifications to an existing web browser software package. For reference, FIG. 6 shows the hardware and software architectures of typical web servers and web browser computer systems. A web browser computer (60) is communicatively interconnected via an Internet or intranet (61) to a web server computer (62). The web browser comprises standard user interface devices (63) such as a computer display or monitor, keyboard, and mouse. The web browser computer (60) hardware platform comprises a central processor ("CPU") (64), disk drives (65), user interface device I/O (66), and network interface card ("NIC") (67). The NIC may be one of several varieties well known within the art, including a dial-up modem, local area network ("LAN") card, or cable modem interface. The software executed by the web browser computer (60) may include device drivers and a basic input/output system ("BIOS") (68), and operating system (603), application programs (602), and an applet interpreter (69) and applets (601). A web browser program, such as Netscape's Navigator, is an application program which can be executed by the CPU (64). This architecture and arrangement with a web server computer is well known within the art.

In the preferred embodiment, the standard web browser application software program is modified to include certain logical and functional enhancements. The functional enhancements utilize several existing capabilities of the existing web browser, such as the abilities to:
(1) interpret received web documents;
(2) cause all or part of a web document to be displayed in the current web browser display window;
(3) display user option icons, drop down lists or other mode control indicators in the web browser display window;
(4) receive user selections of user option icons, drop down lists and other mode control indicators in the web browser display window;
(5) receive, parse and analyze the web address selected by the web browser user; and
(6) cause new web browser instances to be launched or spawned, and to cause the new browser instance to show certain web browser document content.

The basic user control for the invention has 3 states, and is displayed as a control with 3 states, such as a tri-state switch, a drop-down menu, or a Hold/Push-pin button with 3 states/views. In the first state, the browser normal behavior will be enabled. In the second state, or "Hold Mode 1", a new window and browser instance will be launched when a new document address or hyperlink is selected. In the third state, or "Hold Mode 2", only a single new instance of the browser will be launched, in which the contents of the linked documents from the parent page will be displayed. The order of the display of the optional states does not matter to the functionality of the invention.

In the preferred embodiment of the invention, the browser automatically detects when a user has changed from one web site, subdomain, or subdirectory to another web site, subdomain, or subdirectory by parsing the selected web document address and activating a selected hold mode. The user may select in a set of browser preferences which types of address change shall trigger hold mode activation and reset. For example, if the following preferences were selected:

domain (com, edu, gov, co.*) change=yes
host name change=yes
subdomain change=yes
subdirectory change no,
   a change from "ibm.com" to "yahoo.com" (host change) would activate the hold function, as would a change from "patents.ibm.com" to "distributors.ibm.com" (subdomain change). But, a change from "ibm.comtech\support" to "ibm.com\productinfo" (subdirectory change) would not. In another set of user preferences, such as:
domain (com, edu, gov, co.*) change=yes
host name change=yes
subdomain change=no
subdirectory change=no,
   only changes in host names and top level domains (com, edu, gov, co) will trigger the hold mode.

Figure 7:
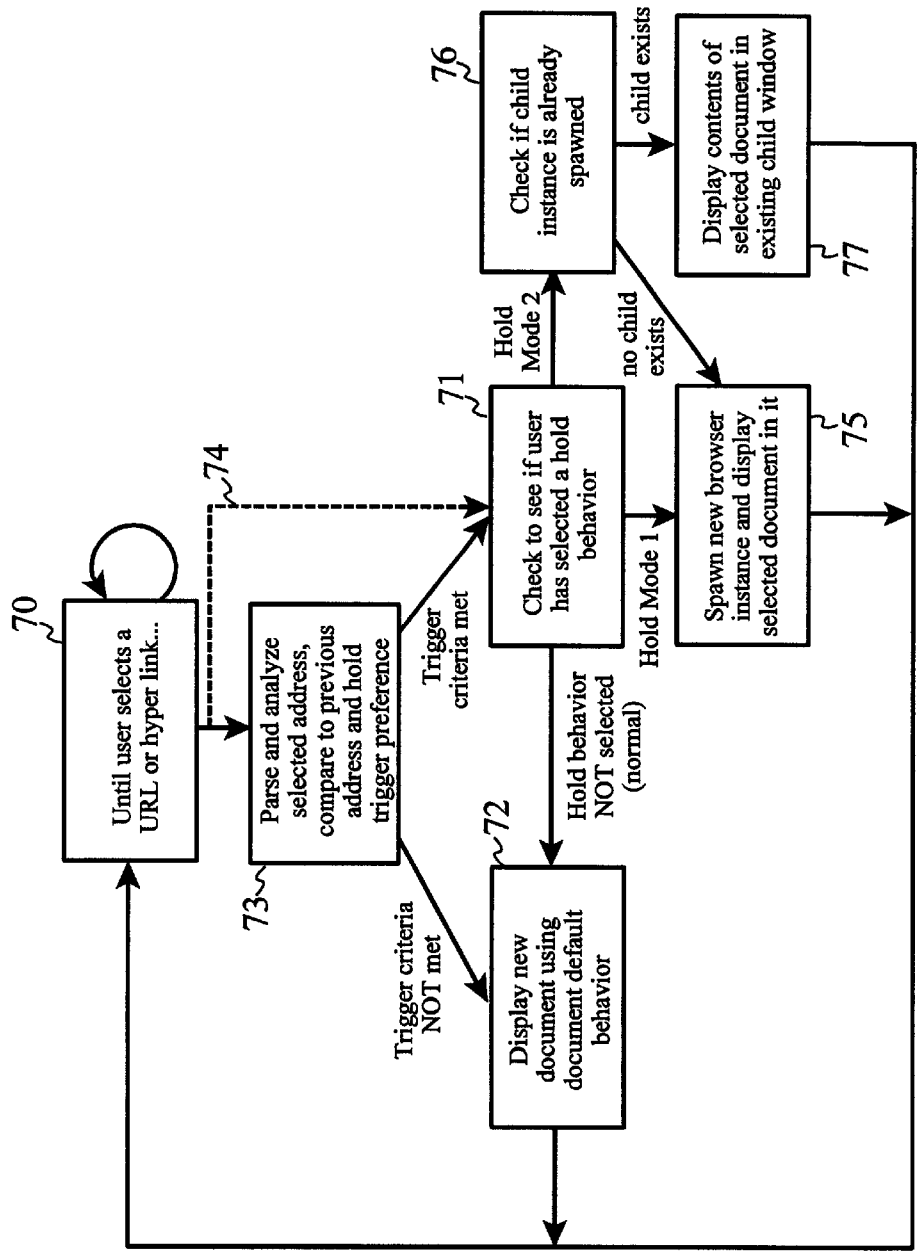
FIG. 7 sets forth the logical and functional process of the invention.

The logical processing of the preferred embodiment of the invention is shown in FIG. 7. Normally, a browser software package is awaiting (70) input from the user to select a hyperlink or to change the web address to which it is pointing. In either case, a new address is selected by the user's action, whether it is a change to a new host, or just a different file on the same host server. When the user selects a hyperlink or new web address, the browser will parse and analyze (73) the selected linked address or web address, comparing it to the previously visited or viewed document address. If the change does not meet the criteria set in the user preferences to activate the hold function, such as the change is only within the same host address and is just another file in the same subdirectory, the browser will display (72) the page "normally" using the default behavior as specified by the page coding. For example, if the code in the selected document displays the document in the current browser window, the new page will replace the old page in the browser window. If the code in the selected document requires the document to be displayed in a new instance of the browser, that will be done. In this case, behavior of the browser is the same as the prior art browsers.

If the change between the two addresses meets the user's preference for activating the hold function, such as a change in the host name from "ibm.com" to "yahoo.com", the browser will check (71) the currently enabled hold mode as selected by the user: normal (no hold), Hold 1 or Hold 2. In this check (71), the three-state nature of the invention is realized.

If "normal" mode is selected, the selected page will be requested from the inked address and will be displayed (72) using the default behavior coded in the document.

If Hold 1 is selected, a new browser instance will be spawned and the selected document will be displayed in the new instance of the browser (75), leaving the parent page visible in the existing instance of the page. Thus, in Hold 1 mode, each selection of a new web address or hyperlink will spawn a new web browser instance.

If Hold 2 is selected, the browser will check (76) to see if a child browser instance has already been created. Hold 2 mode maintains single child and single parent browser instances. If a child browser instance is already created, the selected document will be displayed in the existing child browser instance (77), thereby replacing the document which was displayed in the child browser instance. If no child instance is already in existence, a new browser instance (the child) will be spawned and the selected document will be displayed in it (75).

For a simplified embodiment of the invention, the parsing and analysis of the address change can be omitted (74), such that each time a new address or hyperlink is selected by the user, the invention assumes the current hold mode selection is to be implemented. In such a simplified case, the three state nature of the invention is still present, but the "smart" handling of the hold mode based upon levels of change in the address is removed.

As shown in FIG. 7, the logic of the invention is executed each time a hyperlink or new address is selected in the web browser, and is concluded by returning to the state awaiting (70) a selection of a new web address or hyperlink.

Figure 8:
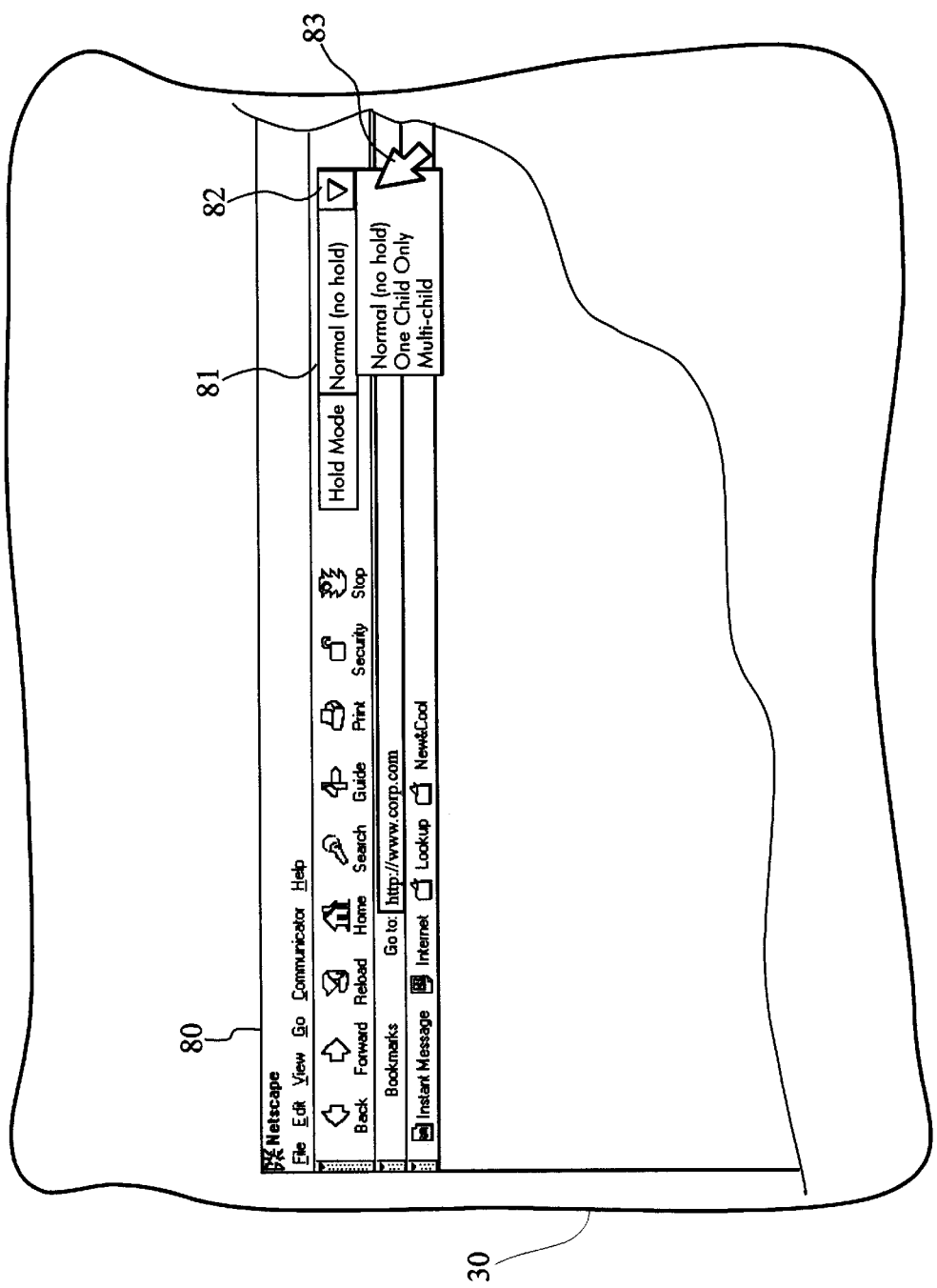
FIG. 8 shows one embodiment of the user interface controls for the invention.

FIG. 8 shows a portion of an enhanced web browser (80) on a portion of a computer screen (30), with a drop-down list (81) for the new controls. In this embodiment of the controls, the user may click with the mouse on the drop-down button (82) by placing the pointer (83) over the drop-down button (82), and select a mode of operation from the list by clicking on it. The current mode will be updated and displayed to the left of the "Hold Mode" display, and the list will be removed. The example of FIG. 8 shows a user prompt of "Multi-child" for Hold 1 and "Single Child" for Hold 2, as described supra. Alternate embodiments may include a single push button with multiple icons or phrases in the button, and the user may click on the button to cycle through the options in a sequence. A third embodiment is a set of radio buttons for the various choices. Preferably, the hold mode trigger preferences are set using dialog boxes with the other preferences for the web browser, such as the preference management dialog which are found by selecting "EDIT" and "PREFERENCES" in Netscape's Navigator browser (keyboard shortcut of ALT-E, E).

It will be understood from the foregoing description that various modifications and changes may be made in the preferred embodiment of the present invention without departing from its true spirit, such as the use of alternate programming methodologies or languages, alternate web browser platforms and software, operating systems and user control objects. It is intended that this description is for purposes of illustration only and should not be construed in a limiting sense. The scope of this invention should be limited only by the language of the following claims.

What is claimed is:

1. A method for retrieving and displaying to a user web documents and objects received over a computer network using a web browser computer, said web browser computer having a processor capable of executing web browser software and having connectivity to a web server computer via a computer network, and having a parent instance of web browser software in execution and operable by a user, said method comprising the steps of:

providing a user hold control having a normal state and at least one hold state, said user control being operable by a user through a user interface on a web browser computer using said parent instance of web browser software;

retrieving web documents and objects from a web server computer via a computer network in response to selection by a user of the web browser computer, each said web document and object being associated with a web address; and displaying said retrieved web documents and objects in a child browser window if a hold state is enabled by the user.

2. A method for retrieving and displaying to a user web documents and objects received over a computer network using a web browser computer as set forth in claim 1, further comprising the steps of:

providing a singular child hold state for said user hold control; and spawning a singular child web browser instance if no child web browser instance is in existence such that the retrieved web documents and objects are displayed in the singular child web browser instance, replacing any display which is already presented in the singular child web browser instance.

3. A method for retrieving and displaying to a user web documents and objects received over a computer network using a web browser computer as set forth in claim 2, further comprising the steps of:

comparing the web address associated with the selected web document or address to a previously selected web address; and overriding the display of the selected document in a child window if web address of the selected document meets predetermined criteria relative to the previously selected web address such that the selected document is displayed "normally" according to any coding contained within the selected document.

4. A method for retrieving and displaying to a user web documents and objects received over a computer network using a web browser computer as set forth in claim 3, wherein said step of comparing the web address of the selected web document or object with a previously selected web address further comprises comparison of Internet Protocol addresses.

5. A method for retrieving and displaying to a user web documents and objects received over a computer network using a web browser computer as set forth in claim 4, wherein said comparison of Internet Protocol addresses further comprises comparison of said selected web address and a previously selected address on a label-by-label basis.

6. A method for retrieving and displaying to a user web documents and objects received over a computer network using a web browser computer as set forth in claim 1, further comprising the steps of:

providing a multiple child hold state for said user hold control; and spawning multiple child web browser instances in response to each selected web document or object such that each selected web document or object is displayed in a new web browser instance and all previously displayed documents in previously spawned child web browser instances remain in tact displaying their respective documents.

7. A method for retrieving and displaying to a user web documents and objects received over a computer network using a web browser computer as set forth in claim 6, further comprising the steps of:

comparing the web address associated with the selected web document or address to a previously selected web address; and overriding the display of the selected document in a child window if web address of the selected document meets predetermined criteria relative to the previously selected web address such that the selected document is displayed "normally" according to any coding contained within the selected document.

8. A method for retrieving and displaying to a user web documents and objects received over a computer network using a web browser computer as set forth in claim 7, wherein said step of comparing the web address of the selected web document or object with a previously selected web address further comprises comparison of Internet Protocol addresses.

9. A method for retrieving and displaying to a user web documents and objects received over a computer network using a web browser computer as set forth in claim 8, wherein said comparison of Internet Protocol addresses further comprises comparison of said selected web address and a previously selected address on a label-by-label basis.

10. A computer program product for retrieving and displaying to a user web documents and objects received over a computer network using a web browser computer, said web browser computer having a processor capable of executing web browser software and having connectivity to a web server computer via a computer network, and having a parent instance of web browser software in execution and operable by a user, said computer program product comprising:

a computer usable medium having computer readable program code means embodied in said medium for providing a user hold control having a normal state and at least one hold state, said user control being operable by a user through a user interface on a web browser computer using said parent instance of web browser software;

a computer usable medium having computer readable program code means embodied in said medium for retrieving web documents and objects from a web server computer via a computer network in response to selection by a user of the web browser computer, each said web document and object being associated with a web address; and a computer usable medium having computer readable program code means embodied in said medium for displaying said retrieved web documents and objects in a child browser window if a hold state is enabled by the user.

11. A computer program product for retrieving and displaying to a user web documents and objects received over a computer network using a web browser computer as set forth in claim 10, further comprising:

a computer usable medium having computer readable program code means embodied in said medium for providing a singular child hold state for said user hold control; and a computer usable medium having computer readable program code means embodied in said medium for spawning a singular child web browser instance if no child web browser instance is in existence such that the retrieved web documents and objects are displayed in the singular child web browser instance, replacing any display which is already presented in the singular child web browser instance.

12. A computer program product for retrieving and displaying to a user web documents and objects received over a computer network using a web browser computer as set forth in claim 11, further comprising:

a computer usable medium having computer readable program code means embodied in said medium for comparing the web address associated with the selected web document or address to a previously selected web address; and a computer usable medium having computer readable program code means embodied in said medium for overriding the display of the selected document in a child window if web address of the selected document meets predetermined criteria relative to the previously selected web address such that the selected document is displayed "normally" according to any coding contained within the selected document.

13. A computer program product for for retrieving and displaying to a user web documents and objects received over a computer network using a web browser computer as set forth in claim 12, wherein said a computer usable medium having computer readable program code means for comparing the web address of the selected web document or object with a previously selected web address further comprises program code means for comparison of Internet Protocol addresses.

14. A computer program product for retrieving and displaying to a user web documents and objects received over a computer network using a web browser computer as set forth in claim 13, wherein said program code means for comparison of Internet Protocol addresses further comprises program code means for comparison of said selected web address and a previously selected address on a label-by-label basis.

15. A computer program product for retrieving and displaying to a user web documents and objects received over a computer network using a web browser computer as set forth in claim 10, further comprising:

a computer usable medium having computer readable program code means embodied in said medium for providing a multiple child hold state for said user hold control; and a computer usable medium having computer readable program code means embodied in said medium for spawning multiple child web browser instances in response to each selected web document or object such that each selected web document or object is displayed in a new web browser instance and all previously displayed documents in previously spawned child web browser instances remain in tact displaying their respective documents.

16. A computer program product for retrieving and displaying to a user web documents and objects received over a computer network using a web browser computer as set forth in claim 15, further comprising:

a computer usable medium having computer readable program code means embodied in said medium for comparing the web address associated with the selected web document or address to a previously selected web address; and a computer usable medium having computer readable program code means embodied in said medium for overriding the display of the selected document in a child window if web address of the selected document meets predetermined criteria relative to the previously selected web address such that the selected document is displayed "normally" according to any coding contained within the selected document.

17. A computer program product for for retrieving and displaying to a user web documents and objects received over a computer network using a web browser computer as set forth in claim 16, wherein said a computer usable medium having computer readable program code means for comparing the web address of the selected web document or object with a previously selected web address further comprises program code means for comparison of Internet Protocol addresses.

18. A computer program product for retrieving and displaying to a user web documents and objects received over a computer network using a web browser computer as set forth in claim 17, wherein said program code means for comparison of Internet Protocol addresses further comprises program code means for comparison of said selected web address and a previously selected address on a label-by-label basis.

19. A web browser system for selecting, retrieving, and displaying web documents and objects from a web server system over a computer network, said web documents and objects having web addresses associated with them, said web browser system comprising:

a computer platform including a processor capable of executing software, a computer readable memory means, a means for interfacing to a web server system via a computer network, a means for receiving input selections from a user, and a means for displaying web documents to a user;

a parent instance of a web browser disposed in said computer readable memory and being executed by said processor, said parent instance having a user interface for displaying a parent web document on said display means and for receiving document selections from a user through said input means, and having at hold mode control operable by a user, said hold mode control having a normal mode and at least one hold mode enablable by a user; and a child spawner under control of said parent instance and activated by enabling of a hold mode of the hold mode control, said child spawner being capable of creating a child instance of a web browser for displaying a selected web document or object, and further being capable of causing an existing child instance of a web browser to display a selected webdocument or object.

20. A web browser system as set forth in claim 19, wherein said means for interfacing to a web server system via a computer network includes a computer network interface and an Internet communications suite and protocol stack.

21. A web browser system as set forth in claim 20, wherein said computer network interface includes a modem.

22. A web browser system as set forth in claim 20, wherein said computer network interface includes a local area network interface card.

23. A web browser system as set forth in claim 19, wherein said means for displaying web documents to a user includes a computer graphical display.

24. A web browser system as set forth in claim 19, wherein said for receiving input selections from a user includes a keyboard.

25. A web browser system as set forth in claim 19, wherein said for receiving input selections from a user includes a mouse.

26. A web browser system as set forth in claim 19 wherein said child spawner is further capable of spawing a singular child instance of a web browser under the control of the parent instance and in response to a user selection of a web document or object for retrieval, said singular child instance being then used to display all subsequently selected web documents and objects in the same singular child instance of a web browser.

27. A web browser system as set forth in claim 19, wherein said child spawner is further capable of spawing a multiple child instances of a web browser under the control of the parent instance and in response to user selections of web documents or objects for retrieval, said multiple child instances being then used to display all subsequently selected web documents and objects in a new child instance such that all displays of previously selected documents and objects are maintained in tact.

28. A web browser system as set forth in claim 19, further comprising:

a web address comparator activated by repoint of the web browser or selection of a web document or object by a user, said comparator having an override output activated by a comparison of the address associated with the web document or object with a previously selected address if said comparison meets predetermined conditions; and an hold overrider which temporarily disables the child spawner in response to said web address comparator output being activated, such that selections of web document, objects, or domain names which differ from the previously selected web address in a manner consistent with said predetermined conditions will allow the display of selected document to be performed according to a default behavior defined by the selected web document or object.

29. A web browser system as set forth in claim 28, wherein said web address comparator further comprises an Internet Protocol address comparator.

30. A web browser system as set forth in claim 29, wherein said Internet Protocol address comparator further comprises a label-to-label comparator.

* * * * *